United States Patent
Trimmer et al.

(10) Patent No.: US 10,556,280 B2
(45) Date of Patent: Feb. 11, 2020

(54) METHODS AND SYSTEMS FOR ELECTROCHEMICAL MACHINING

(71) Applicant: GENERAL ELECTRIC COMPANY, Schenectady, NY (US)

(72) Inventors: Andrew Lee Trimmer, Niskayuna, NY (US); John Malott Cottrill, Franklin, OH (US)

(73) Assignee: GENERAL ELECTRIC COMPANY, Niskayuna, NY (US)

( * ) Notice: Subject to any disclaimer, the term of this patent is extended or adjusted under 35 U.S.C. 154(b) by 114 days.

(21) Appl. No.: 15/903,322

(22) Filed: Feb. 23, 2018

(65) Prior Publication Data

US 2019/0262923 A1  Aug. 29, 2019

(51) Int. Cl.
  *B23H 3/10* (2006.01)
  *B23H 7/32* (2006.01)

(52) U.S. Cl.
  CPC ............. *B23H 3/10* (2013.01); *B23H 7/32* (2013.01); *B23H 2300/10* (2013.01); *B23H 2600/12* (2013.01)

(58) Field of Classification Search
  CPC ...................................................... B23H 3/10
  See application file for complete search history.

(56) References Cited

U.S. PATENT DOCUMENTS

| 3,271,291 A | 9/1966 | Howard et al. |
| 3,430,851 A | 3/1969 | Abt |
| 4,522,692 A | 6/1985 | Joslin |
| 4,851,090 A | 7/1989 | Bruns et al. |
| 5,114,548 A | 5/1992 | Rhoades |
| 5,714,054 A | 2/1998 | Frembgen |
| 6,402,931 B1 | 6/2002 | Zhou et al. |
| 8,506,770 B2 | 8/2013 | Kiesel et al. |
| 2003/0024825 A1* | 2/2003 | Lamphere ............... B23H 1/00 205/640 |
| 2013/0193112 A1 | 8/2013 | Murai et al. |
| 2016/0256945 A1 | 9/2016 | Goto et al. |
| 2016/0362810 A1 | 12/2016 | Trimmer et al. |
| 2017/0239741 A1 | 8/2017 | Furuta |

(Continued)

FOREIGN PATENT DOCUMENTS

| CN | 103658884 B | 4/2016 |
| EP | 0680801 A1 | 11/1995 |

(Continued)

OTHER PUBLICATIONS

Bhattacharyya et al., "Electrochemical machining: new possibilities for micromachining", Robotics and Computer-Integrated Manufacturing, vol. 18, Issues: 3-4, pp. 283-289, 2002.

(Continued)

*Primary Examiner* — Nicholas A Smith
(74) *Attorney, Agent, or Firm* — Fletcher Yoder, P.C.

(57) ABSTRACT

A method of operating an electrochemical machining system includes selectively performing an electrochemical machining process by an electrochemical machine of the electrochemical machining system in a macromachining mode or a micromachining mode by controlling a purity level of a machining liquid supplied to the electrochemical machine.

18 Claims, 4 Drawing Sheets

(56) References Cited

U.S. PATENT DOCUMENTS

2018/0169112 A1    6/2018  Schmidt
2019/0210130 A1*   7/2019  Bittner .................... B23H 5/08

FOREIGN PATENT DOCUMENTS

GB           1081902 A   *  9/1967   .............. B23H 3/10
JP        H0691431 B2   * 11/1994   ........... H03K 3/0372

OTHER PUBLICATIONS

Guodong et al., "Selection and Optimization of Electrolyte for Micro Electrochemical Machining on Stainless Steel 304", Procedia CIRP, vol. 42, pp. 412-417, 2016.
PCT/US2019/013920; International Search Report Written Opinion; dated May 8, 2019; 14 pages.

\* cited by examiner

METHODS AND SYSTEMS FOR ELECTROCHEMICAL MACHINING

BACKGROUND

The present disclosure generally relates to electrochemical machining, and more particularly, to methods and systems for performing electrochemical machining.

Electrochemical machining (ECM) is a process of removing electrically conductive material such as metallic materials by an electrochemical process. It is typically used for machining (working/finishing) a workpiece composed of an electrically conductive material. Generally, metals and alloys that have a high hardness and are difficult to machine with conventional methods, are machined using ECM. ECM generally provides desired shape control and a smooth surface finish for manufacturing the components, for example compressor airfoils such as blades for gas turbines, jet engines, and power generation.

During ECM process, the electrically conductive material is oxidized from the workpiece using an applied potential allowing a current to flow in an electrochemical cell at a controlled rate. The workpiece serves as an anode and is separated by a gap from a tool electrode, which serves as a cathode. The electrolyte, usually a salt solution in water, flows through the gap, flushing away the oxidized material from the workpiece. This electrolyte after use (or the used electrolyte) contains a quantity of metal ions, that have been precipitated out of the solution as oxides, hydrates, or hydroxides, and is often referred to as sludge. As the tool electrode moves towards the workpiece to maintain a controlled gap, the workpiece is machined into the complementary shape of the tool electrode.

In a typical ECM system, the used electrolyte containing the metal ions generated during the ECM process can be treated or cleaned for removing the metal ions from the used electrolyte. The treated or cleaned electrolyte may contain a reduced or minimal amount of metal ions and can be re-used, recycled or re-supplied to the ECM system for the subsequent ECM process.

Moreover, the ECM process can be performed in a macromachining mode or a micromachining mode for shaping or finishing a workpiece depending on the required material removal and geometric fidelity. The macromachining process may have the attribute of a high material removal rate, which involves bulk machining and is often used in shaping of a workpiece. The micromachining process may have better geometric control and surface finish compared to the macromachining process at the expense of speed i.e. material removal rate. However, an ECM system can typically be operated either in the macromachining mode or the micromachining mode because of the requirement of specific process parameters such as a gap between electrodes, a potential applied to electrodes for performing the macromachining process or the micromachining process, and the purity level of the electrolyte.

BRIEF DESCRIPTION

Some aspects of the specification are directed to a method of operating an electrochemical machining system. The method includes selectively performing an electrochemical machining process by an electrochemical machine of the electrochemical machining system in a macromachining mode or a micromachining mode by controlling a purity level of a machining liquid supplied to the electrochemical machine.

In some aspects, a method of operating an electrochemical machining system includes directing a used machining liquid from an electrochemical machine to a first container, receiving the used machining liquid in the first container, supplying a volume of the used machining liquid from the first container to a separation system, wherein the separation system is configured to receive the used machining liquid and deliver a treated machining liquid, receiving the treated machining liquid in a second container, and selectively performing an electrochemical machining process by said electrochemical machine in a macromachining mode or a micromachining mode by controlling supply of a quantity of the used machining liquid from the first container and a quantity of the treated machining liquid from the second container to said electrochemical machine.

In some other aspects of the specification, a method of operating an electrochemical machining system includes selectively performing an electrochemical machining process by an electrochemical machine of said electrochemical machining system in a macromachining mode by applying a first potential to said electrochemical machine or in a micromachining mode by applying a second potential to said electrochemical machine, wherein the first potential is higher than the second potential.

In some aspects of the specification, an electrochemical machining system includes an electrochemical machine configured to selectively perform an electrochemical machining process in a macromachining mode or a micromachining mode, a first container in fluid communication with the electrochemical machine and configured to contain a used machining liquid received from the electrochemical machine, a separation system in fluid communication with the first container, wherein the separation system is configured to treat a volume of the used machining liquid received from the first container and deliver a treated machining liquid, a second container in fluid communication with the separation system and configured to contain the treated machining liquid received from the separation system and a flow controller in fluid communication with the first container and the second container. The flow controller is configured to direct a quantity of the used machining liquid, a quantity of the treated machining liquid or a combination thereof to said electrochemical machine to selectively provide a low purity machining liquid when said electrochemical machine performs the electrochemical machining process in the macromachining mode or a high purity machining liquid when said electrochemical machine performs the electrochemical machining process in the micromachining mode.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

Figure 1:
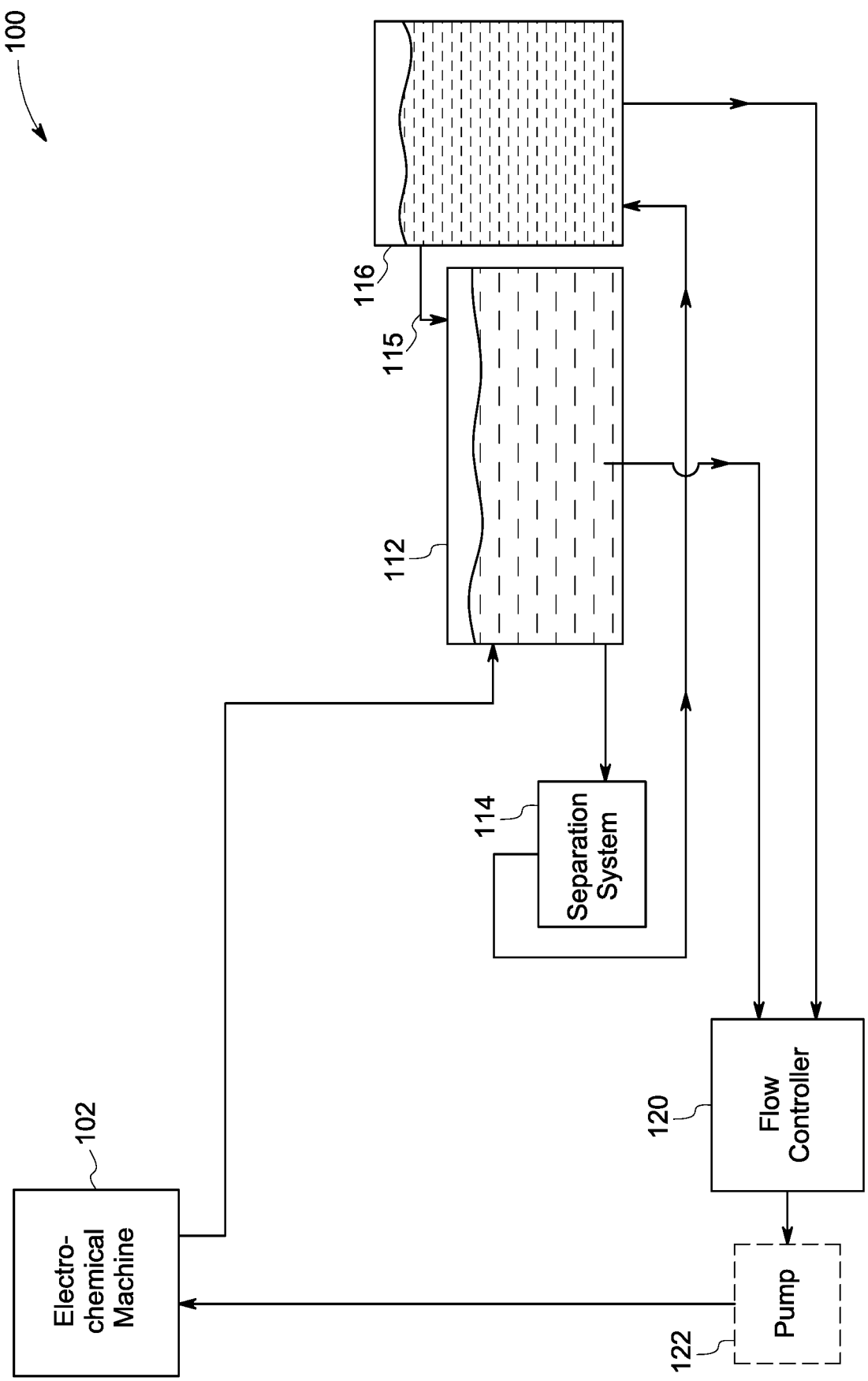
FIG. 1 shows a schematic diagram of an ECM system, in accordance with some embodiments of the disclosure.

It is noted that the drawings of the disclosure are not to scale. The drawings are intended to depict only typical aspects of the disclosure, and therefore should not be considered as limiting the scope of the disclosure.

DETAILED DESCRIPTION

Embodiments of the present disclosure provide ECM systems and methods for operating the ECM systems that selectively perform the ECM process in a macromachining mode or a micromachining mode. In some embodiments, the ECM process may be serially performed by the single ECM machine in a macromachining mode and a micromachining mode.

In the following specification and the claims, the singular forms "a", "an" and "the" include plural referents unless the context clearly dictates otherwise. As used herein, the term "or" is not meant to be exclusive and refers to at least one of the referenced components being present and includes instances in which a combination of the referenced components may be present, unless the context clearly dictates otherwise.

Approximating language, as used herein throughout the specification and claims, may be applied to modify any quantitative representation that could permissibly vary without resulting in a change in the basic function to which it is related. Accordingly, a value modified by a term or terms, such as "about" and "substantially", is not limited to the precise value specified. In some instances, the approximating language may correspond to the precision of an instrument for measuring the value.

As used herein, the term "macromachining mode" refers to an ECM process that involves bulk machining of a workpiece in which a quantity of the material of the workpiece is removed with a high material removal rate during oxidation. In some embodiments, the ECM process is performed in the macromachining mode by applying a direct current (DC) potential higher than 3 volts to the electrochemical machine 102. Furthermore, in the macromachining mode, an electrode gap between the anode and cathode of the electrochemical machine (for example, electrochemical cell) may be higher than 0.05 millimeters.

As used herein, the term "micromachining mode" refers to an ECM process that involves fine machining of a workpiece in which oxidation occurs in a more controlled way compared to that of the macromachining mode yielding a high geometric control and a smooth surface finish. In some embodiments, the ECM process is performed in the micromachining mode by applying a pulsed potential to the electrochemical machine 102. In some embodiments, the pulsed potential has an average potential lower than 3 volts. Further, the electrode gap between the anode and the cathode of the electrochemical machine, in the micromachining mode, may be less than 0.5 millimeters.

As used herein, the term "used machining liquid" refers to a machining liquid or sludge received from an electrochemical machine after performing an ECM process. In some embodiments, the used machining liquid includes a quantity of contaminants such as metal oxides, metal ions or combinations thereof generated during the ECM process. In some embodiments, the used machining liquid contains greater than about 1 weight percent contaminants, based on the total quantity of the used machining liquid. In some embodiments, a concentration of contaminants in the used machining liquid is in a range from about 2 weight percent to about 5 weight percent, based on the total quantity of the used machining liquid.

As used herein, the term "treated or cleaned machining liquid" refers to a machining liquid received after substantial removal of the contaminants from the used machining liquid. As used herein, the term "substantial removal" means that most of the contaminants, for example more than 95 percent of a total quantity of the contaminants in the used machining liquid is removed. In some embodiments, the treated or cleaned machining liquid contains less than 0.1 weight percent contaminants, based on the total amount of the treated or cleaned machining liquid. In some embodiments, the treated or cleaned machining liquid contains from about 0.01 weight percent to about 0.08 weight percent contaminants, based on the total amount of the treated or cleaned machining liquid.

As used herein, the term "purity level" is measured by a concentration of contaminants in a machining liquid. Lower the concentration of contaminants in the machining liquid, the higher the purity level of the machining liquid. In some embodiments, the machining liquid has a low purity level when the concentration of the contaminants in the machining liquid is greater than 1 weight percent based on a total amount of the machining liquid. In these embodiments, the machining liquid may also be referred to as "low purity machining liquid." In some embodiments, a concentration of contaminants in the low purity machining liquid is in a range from 1 weight percent to about 2 weight percent, based on the total quantity of the used machining liquid. In some other embodiments, the machining liquid has a high purity level when the concentration of the contaminants in the machining liquid is less than 0.1 weight percent, based on the total amount of the machining liquid. In these embodiments, the machining liquid may be referred to as "high purity machining liquid." In some embodiments, a concentration of contaminants in the high purity machining liquid is in a range from about 0.01 weight percent to about 0.08 weight percent, based on the total quantity of the used machining liquid. In some embodiments, the high purity machining liquid may have a concentration of the contaminants that does not change the Nernst potential of the electrochemical machine by more than 10%. The term, "Nernst potential", as used herein, refers to a chemical potential of ions in an electrochemical cell, which can be calculated from the Nernst equation.

The machining liquid may be an electrolyte such as a base, an acid, or an ionic liquid. In some embodiments, the machining liquid includes ionic salts, binary acids, organic acids, deep eutectics, molten salts or combinations thereof. The machining liquid may be an aqueous electrolyte such as an aqueous salt electrolyte including water and a salt. In some embodiments, the electrolyte may be 10 percent aqueous solution of sodium nitrate (by weight) to about 30 percent (saturation point) aqueous solution of sodium nitrate (by weight). For example, about 20 percent aqueous solution of sodium nitrate (by weight) may be used for electrochemically machining nickel-based alloys such as Inconel 718. It will be appreciated that other aqueous solution electrolytes may be employed with the technique of the present disclosure Some embodiments are directed to a method of operating an electrochemical machining system including selectively performing an electrochemical machining process on an electrochemical machine of the electrochemical machining system in a macromachining mode or a micromachining mode by controlling a purity level of a machining liquid supplied to the electrochemical machine. In some embodiments, the step of controlling the purity level of the machining liquid includes selectively providing a low purity machining liquid to the electrochemical machine when performing the electrochemical machining process in the macromachining mode or a high purity machining liquid to the electrochemical machine when performing the electrochemical machining process in the micromachining mode.

In some embodiments, a method of operating an ECM system includes selectively performing an ECM process by an electrochemical machine of the ECM system in a macromachining mode by applying a first potential to the electrochemical machine or a micromachining mode by applying a second potential to the electrochemical machine. In some embodiments, the first potential is higher than the second potential. In some embodiments, the first potential is a DC potential higher than 3 volts. In some embodiments, the second potential is a pulsed potential having an average potential lower than 3 volts.

In some embodiments, an electrochemical machining system includes an electrochemical machine configured to selectively perform an electrochemical machining process in a macromachining mode or a micromachining mode, a first container in fluid communication with the electrochemical machine and configured to contain a used machining liquid received from the electrochemical machine, a separation system in fluid communication with the first container, wherein the separation system is configured to treat a volume of the used machining liquid and deliver a treated machining liquid, a second container in fluid communication with the separation system and configured to contain the treated machining liquid received from the separation system and a flow controller in fluid communication with the first container and the second container. The flow controller is configured to selectively direct a quantity of the used machining liquid, a quantity of the treated machining liquid, or a combination thereof to the electrochemical machine to selectively provide a low purity machining liquid when the electrochemical machine performs the ECM process in the macromachining mode or a high purity machining liquid when the electrochemical machine performs the ECM process in the micromachining mode. In some embodiments, the first container is in fluid communication with the second container.

Figure 2:
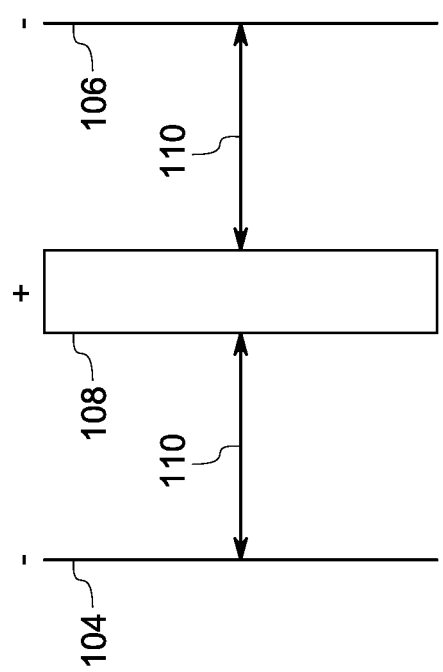
FIG. 2 is a schematic of an electrochemical cell, in accordance with some embodiments of the disclosure.

FIG. 1 illustrates an ECM system 100 for selectively performing an ECM process for machining one or more workpieces in a macromachining mode or micromachining mode. The ECM system 100 includes an electrochemical machine 102. The ECM machine 102 includes an electrochemical cell that has a first tool electrode 104, a second tool electrode 106, and a workpiece 108 disposed between the first tool electrode 104 and the second tool electrode 106, as shown in FIG. 2. During operation, the workpiece 108 may act as an anode, and the first tool electrode 104 and the second tool electrode 106 may act as cathodes. The workpiece 108 is separated from each of the first tool electrode 104 and the second tool electrode 106 by an electrode gap 110. In some embodiments, the two tool electrodes 104, 106 may form a clam shell electrode. The electrode gap 110 can be varied by moving the first tool electrode 104, the second tool electrode 106, the workpiece 108 or a combination thereof.

The electrochemical machine 102 is configured to selectively perform an ECM process in a macromachining mode or a micromachining mode in the ECM system 100. In some embodiments, the electrode gap 110 is controlled to have a first electrode gap when the electrochemical machine 102 performs the ECM process in the macromachining mode. In some embodiments, the first electrode gap is greater than 0.1 millimeter. In some embodiments, the first electrode gap is in a range from about 0.2 millimeters to about 2 millimeters. In some embodiments, the first electrode gap is in a range from about 0.5 millimeters to about 1.5 millimeters. In some other embodiments, the electrode gap 110 is controlled to have a second electrode gap when the electrochemical machine 102 performs the ECM process in the micromachining mode. In some embodiments, the second electrode gap is less than 0.05 millimeters. In some embodiments, the second electrode gap is in a range from about 0.03 millimeters to about 0.0025 millimeters. In some embodiments, the second electrode gap is in a range from about 0.01 millimeter to about 0.001 millimeter. Moreover, in some embodiments, the first electrode gap that is controlled between the workpiece 108 and the tool electrodes (104, 106) while performing the ECM process in the macromachining mode is greater than the second electrode gap that is controlled between the workpiece 108 and the tool electrodes (104, 106) while performing the ECM process in the micromachining mode.

Generally, during operation, the machining liquid is disposed in the electrode gap 110 between the workpiece 108 and the tool electrodes (104, 106). In some instances, the machining liquid may be continuously forced though the electrode gap 110 to rinse the workpiece 108 and the tool electrodes (104, 106). Initially, a high purity machining liquid is disposed between the workpiece 108 and the tool electrodes (104, 106) in the electrochemical machine 102 for performing the ECM process for starting the operation of the ECM system 100. On performing the ECM process, a used machining liquid may be received from the electrochemical machine 102 post ECM process. This used machining liquid may be treated for substantially removing the contaminants, and a treated or cleaned machining liquid may be supplied to the electrochemical machine 102 to continue performing ECM process.

Referring to FIG. 1, the ECM system 100 includes a first container 112 that is in fluid communication with the electrochemical machine 102. The used machining liquid received from the electrochemical machine 102 is supplied to the first container 112. The first container 112 is configured to contain the used machining liquid. The ECM system 100 further includes a separation system 114 in fluid communication with the first container 112. The separation system 114 is configured to treat a volume of the used machining liquid received from the first container 112.

The separation system 114 may be a device that can treat the used machining liquid to substantially separate or remove the contaminants from the used machining liquid. In some embodiments, the separation system 114 includes a centrifuge system. As used here, the term "substantially separate or remove the contaminants" means that most of the contaminants, for example more than 95 percent of a quantity of the contaminants in the used machining liquid is being separated or removed. After treatment of the received used machining liquid, the separation system 114 delivers a treated or cleaned machining liquid. The separation system 114 is in fluid communication with a second container 116 that contains the treated machining liquid received from the separation system 114. In some embodiments, the treated machining liquid from the separation system 114 can be pumped to the second container 116.

Figure 3:
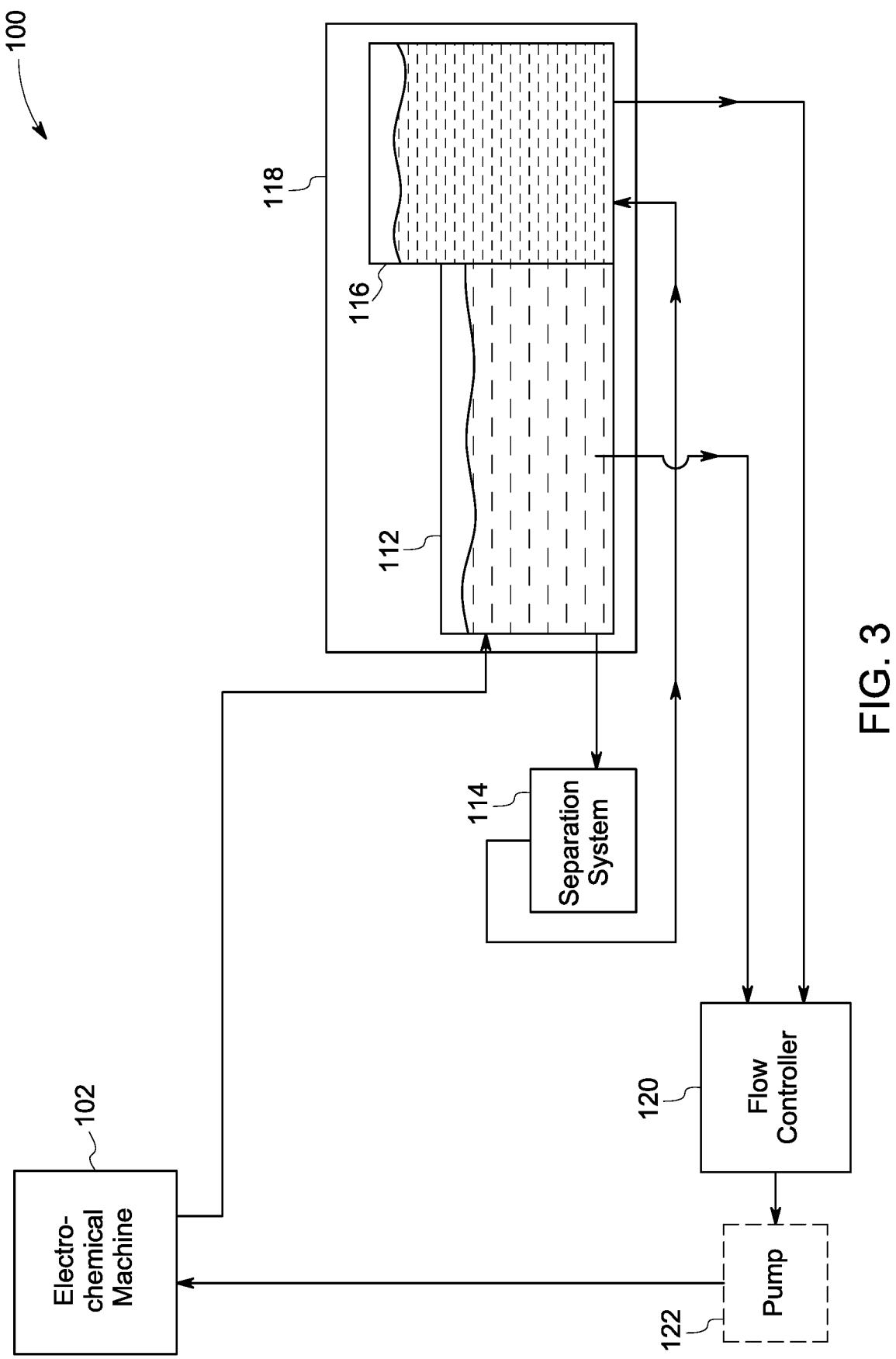
FIG. 3 shows a schematic diagram of an ECM system, in accordance with some other embodiments of the disclosure.

In some embodiments, the first container 112 and the second container 116 are in fluid communication such that the treated machining liquid may flow from the second container 116 to the first container 112. For example, the first container 112 and the second container 116 may be in fluid communication via a means 115 for example, a conduit such that the treated machining liquid from the second container 116 flows to the first container 112. By adding the treated machining liquid to the used machining liquid in the first container 112 may reduce the concentration of contaminants in the used machining liquid in the first container 112, which is subsequently supplied to the separation system 114 for the treatment and hence may aid in enhancing the overall efficiency. In some embodiments, as illustrated in FIG. 3, the first container 112 and the second container 116 are disposed adjacent to each other in a large container 118. In these instances, the second container 116 is higher than the first container 112. During the operation, the treated machining liquid in the second container 116 may overflow and get poured in to the first container 112. This can be allowed by controlling the supply of the used machining liquid to the first container 112, supply of the used machining liquid to the separation system 114, supply of the treated machining liquid from the separation system 114 to the second container 116, or combinations thereof.

Figure 4:
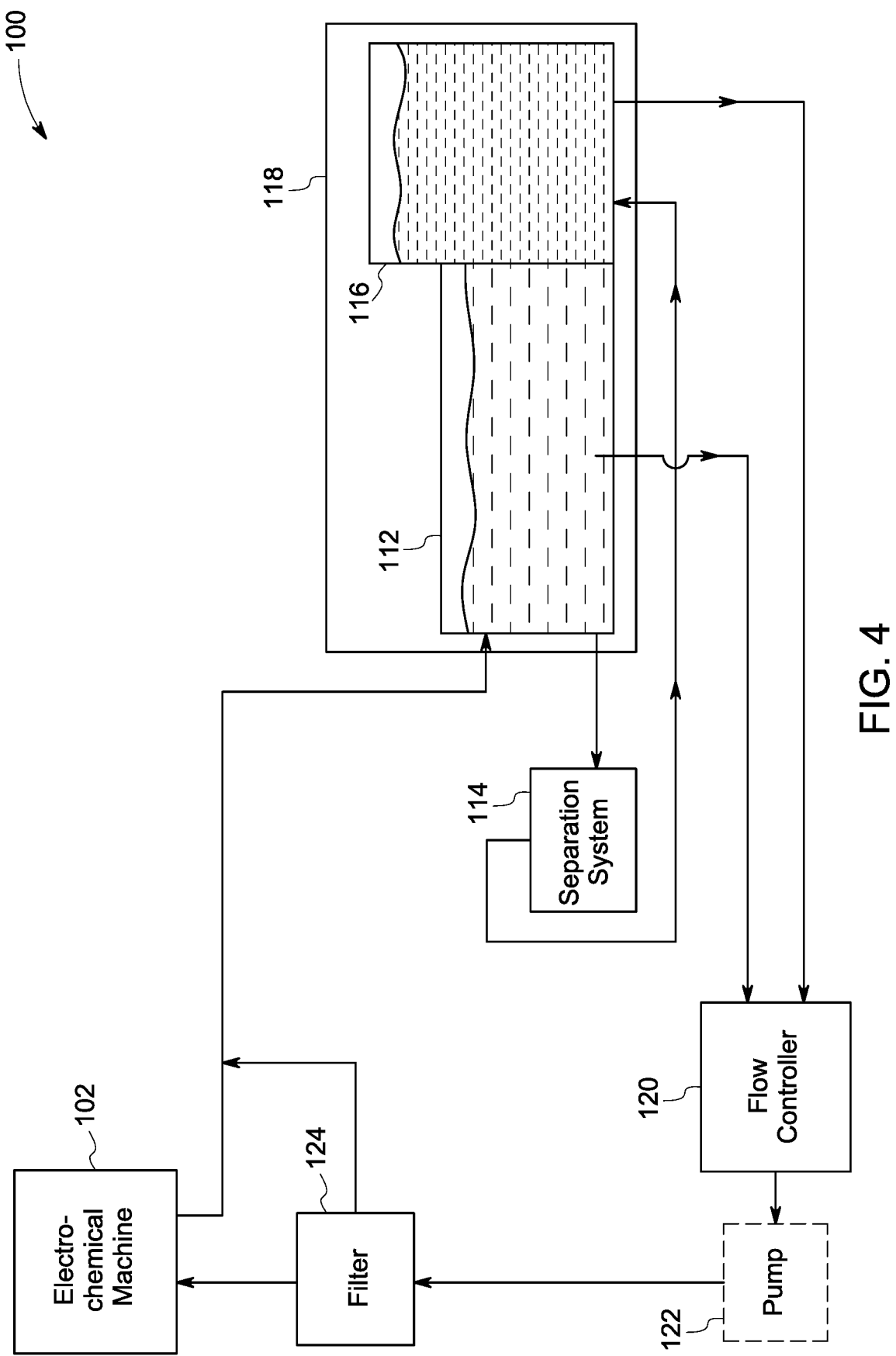
FIG. 4 shows a schematic diagram of an ECM system, in accordance with yet some other embodiments of the disclosure.

In the ECM system 100, the first container 112 and the second container 116 are in fluid communication with a flow controller 120 as illustrated in FIGS. 1, 3, and 4. The flow controller 120 is configured to selectively provide a low purity machining liquid when the electrochemical machine 102 performs the ECM process in the macromachining mode or a high purity machining liquid when the electrochemical machine 102 performs the ECM process in the micromachining mode. In some embodiments, the flow controller 120 is configured to direct a quantity of the used machining liquid, a quantity of the treated machining liquid or a combination thereof to the electrochemical machine 102 to selectively provide the low purity machining liquid when the electrochemical machine performs the ECM process in the macromachining mode or the high purity machining liquid when the electrochemical machine 102 performs the ECM process in the micromachining mode. The flow controller 120 may control the supply of the desired quantities of the used machining liquid from the first container 112, the treated machining liquid from the second container 116 or a combination thereof to the electrochemical machine 102. The desired quantities of the used machining liquid and the treated machining liquid may be predetermined such as to selectively direct the low purity machining liquid or the high purity machining liquid to the electrochemical machine 102. By tailoring the quantities of the used machining liquid and the treated machining liquid to flow towards the electrochemical machine 102, a machining liquid of a desired purity level can be supplied to the electrochemical machine 102.

In embodiments of performing the ECM process in macromachining mode, the flow controller 120 controls the supply of a predetermined quantity of the used machining liquid from the first container 112 and a predetermined quantity of the treated machining liquid from the second container 116 to provide the low purity machining liquid to the electrochemical machine 102. In embodiments of performing the ECM process in the micromachining mode, the flow controller 120 controls the supply of a predetermined quantity of the used machining liquid from the first container 112 and a predetermined quantity of the treated machining liquid from the second container 116 to provide the high purity machining liquid to the electrochemical machine 102. In some embodiments, the flow controller 120 allows the supply of the treated machining liquid and prevent the supply of the used machining liquid. However, a small amount of the used machining liquid may be directed to the electrochemical machine 102. The small amount of the used machining liquid is such as the concentration of contaminants in the combination of the used machining liquid and the treated machining liquid directed to the electrochemical machine 102 provides the high purity machining liquid.

In some embodiments, the flow controller 120 is a three-way valve. Other suitable examples include a blending manifold composed of servo controlled valves operated in a way that provides predetermined quantities of the used machining liquid and the treated machining liquid to supply the low purity machining liquid and the high purity machining liquid to the electrochemical machine 102.

In some embodiments, the ECM system 100 may further include a pump 122 in fluid communication with the flow controller 120 and the ECM machine 102. The pump 122 may help in selectively supplying the low purity machining liquid or the high purity machining liquid to the electrochemical machine 102.

In some embodiments as shown in FIG. 4, a filter 124 may be arranged between the flow controller 120 and the electrochemical machine 102. In some embodiments, the filter 124 may help in removing an amount of contaminants from the low purity machining liquid before supplying it to the electrochemical machine 102. The filter 124 may help in removing any contaminants having particle size greater than 30 microns. when the low purity machining liquid is supplied to electrochemical machine 102. In these instances, the filtrate (that includes contaminants) can be supplied to the first container 112 for recycling.

The system 100 may further include a decanter (not shown in Figures). The decanter may be in fluid communication with the separation system 114. The enriched sludge stream from the separation system 114 (after treatment) may be supplied to the decanter. After decanting, the decanted machining liquid may be supplied to the first container 112.

Moreover, the ECM system 100 may further include a controller, a power supply, and an actuator. The controller may be operably connected to the power supply for controlling the voltage to the workpiece 108, the first tool electrode 104, and the second tool electrode 106 in the electrochemical machine 102. The controller may further be operably connected to the actuator for controlling movement of the tool electrodes (104, 106) and/or the workpiece 108 toward each other during the ECM process. The controller and power supply may be separate units or be a combined unit. The controller may be further configured to maintain temperature, pH value or a combination thereof of the used machining liquid and the treated machining liquid in the ECM system 100. The temperatures of the used machining liquid and the treated machining liquid are maintained at every stage in the ECM system 100 at desired values by using heat exchangers, heaters, coolers or combinations thereof. The pH levels of the used machining liquid and the treated machining liquid are maintained at every stage in the ECM system 100 at desired values by adding suitable acids, bases, buffers or combinations thereof.

In some embodiments, a method for operating the ECM system 100 for selectively performing an ECM process in the macromachining mode or the micromachining mode is described with reference to FIGS. 1-4. In some embodiments, the method for operating the ECM system 100 includes selectively performing an ECM process by the electrochemical machine 102 of the ECM system 100 in the macromachining mode or the micromachining mode by controlling a purity level of the machining liquid supplied to the electrochemical machine 102. In some embodiments, the step of controlling the purity level of the machining liquid includes selectively providing a low purity machining liquid to the electrochemical machine 102 when performing the ECM process in the macromachining mode or a high purity machining liquid to the electrochemical machine 102 when performing the ECM process in the micromachining mode.

In some embodiments, a method of operating the ECM system 100 includes selectively performing the ECM process by the electrochemical machine 102 of the ECM system 100 in the macromachining mode by applying a first potential to the electrochemical machine 102 or the micromachining mode by applying a second potential to the electrochemical machine 102. In some embodiments, the first potential is higher than the second potential In some embodiments, the method includes directing the used machining liquid from the electrochemical machine 102 to the first container 112. The first container 112 receives the used machining liquid delivered from the electrochemical machine 102 post ECM process. The method includes supplying a volume of the used machining liquid from the first container 112 to the separation system 114. The separation system 114 is configured to treat the used machining liquid received from the first container 112 and deliver the treated machining liquid. In one embodiment, the separation system 114 includes a centrifuge system that removes contaminants from the used machining liquid and deliver the treated or cleaned machining liquid (that includes <0.01 weight percent contaminants). Next step of the method includes receiving the treated machining liquid in the second container 116. The method includes selectively performing an ECM process by electrochemical machine 102 in a macromachining mode or a micromachining mode by controlling supply of a quantity of the used machining liquid from the first container 112, a quantity of the treated machining liquid from the second container 116 or a combination thereof to the electrochemical machine 102. In some embodiments, the step of controlling the supply of a quantity of the used machining liquid, a quantity of the treated machining liquid or a combination thereof is performed by the flow controller 120.

In some embodiments, the method includes supplying an amount of the treated machining liquid from the second container 116 to the first container 112 as described previously with respect to FIGS. 1 and 3. This may help in suppressing the concentration of the contaminants in the used machining liquid contained in the first container 112, which is subsequently supplied to the separation system 114.

In embodiments when the electrochemical machine 102 performs in the macromachining mode, the method includes supplying the predetermined quantities of the used machining liquid from the first container 112 and the treated machining liquid from the second container 116 such that the combination is a low purity machining liquid. Further, the method includes applying the first potential on the electrochemical machine 102. In some embodiments, the first potential applied to the electrochemical machine 102 is a DC potential greater than 3 volts. In some embodiments, the DC potential applied to the electrochemical machine 102 may be in a range from about 5 volts to about 20 volts. Further, in some embodiments, the method includes controlling the electrode gap 110 greater than 0.05 millimeters. In some embodiments, the method includes controlling the electrode gap 110 greater than 0.1 millimeter. In some embodiments, the method includes controlling the electrode gap 110 in a range from about 0.1 millimeter to about 2 millimeters. In some embodiments, the electrode gap 110 is controlled in a range from about 0.5 millimeters to about 1.5 millimeters.

In embodiments when the electrochemical machine 102 performs in the micromachining mode, the method includes controlling the supply of a quantity of the used machining liquid and a quantity of the treated machining liquid such that a high purity machining liquid is supplied to the machine 102. In some embodiments, the method includes supplying the treated machining liquid from the second container 116 and preventing the supply of the used machining liquid from the first container 112. However, in some embodiments, a small quantity of the used machining liquid may be allowed that maintains the concentration of contaminants in the machining liquid to supply the high purity machining liquid to electrochemical machine 102. Further, the method includes applying the second potential on the electrochemical machine 102. The second potential applied to the electrochemical machine 102 may be a pulsed potential having an average potential lower than 3 volts. The pulsed potential may have a duty factor that drives net oxidation of the workpiece 108. As used herein, the term "average potential" is an average of the off-time potential and the on-time potential of the pulsed potential. In some embodiments, the average potential of the pulsed potential is in a range from about 0.1 volt to about 2 volts. Furthermore, in some embodiments, the method includes controlling the electrode gap 110 (FIG. 2) in the electrochemical machine 102 less than 0.5 millimeters. In some embodiments, the method includes controlling the electrode gap 110 less than 0.3 millimeter. In some embodiments, the method includes controlling the electrode gap 110 in a range from about 0.1 millimeter to about 0.0025 millimeters. In some embodiments, the electrode gap 110 is controlled in a range from about 0.05 millimeters to about 0.001 millimeter.

Moreover, the method includes controlling the temperature and pH of the used machining liquid and the treated machining liquid to predetermined values for selectively performing the ECM process in the macromachining mode or the micromachining mode. For example, in some embodiments, the temperature of the used machining liquid in the first container 112 may be controlled at about 38 degrees Celsius and the temperature of the treated machining liquid can be controlled at about 43 degrees Celsius. Referring to FIG. 4, in some embodiments, the method further includes the step of filtering the low purity machining liquid via the filter 124 before the low purity machining liquid enters the electrochemical machine 102.

As described herein, embodiments of the present disclosure advantageously provide ECM systems and methods for operating the ECM systems that selectively perform the ECM process in a macromachining mode or a micromachining mode on a single ECM machine. In some embodiments, the ECM process may be serially performed by the single ECM machine in a macromachining mode and a micromachining mode. The disclosed ECM system and methods allow to selectively switch between the macromachining mode and the micromachining mode by controlling and tailoring required parameters to perform the ECM process in the macromachining mode or the micromachining mode. Further, these rearrangements in the ECM systems and methods for operating the ECM systems can be made without excessive equipment or multiple setups within a value stream that may create certain machining outcomes.

While only certain features of the disclosure have been illustrated and described herein, many modifications and changes will occur to those skilled in the art. It is, therefore, to be understood that the appended claims are intended to cover all such modifications and changes as fall within the true spirit of the disclosure.

The invention claimed is:

1. A method of operating an electrochemical machining system, comprising:
selectively performing an electrochemical machining process by an electrochemical machine of the electrochemical machining system in a macromachining mode or a micromachining mode by controlling a purity level of a machining liquid supplied to said electrochemical machine.

2. The method of claim 1, wherein the controlling the purity level of the machining liquid comprises selectively providing a low purity machining liquid to said electrochemical machine when performing the electrochemical machining process in the macromachining mode or a high purity machining liquid to said electrochemical machine when performing the electrochemical machining process in the micromachining mode.

3. The method of claim 2, wherein the selectively providing the low purity machining liquid or the high purity machining liquid comprises controlling supply of a quantity of a used machining liquid received from said electrochemical machine, a quantity of a treated machining liquid received from a separation system, or a combination thereof to said electrochemical machine.

4. The method of claim 3, further comprising:
directing the used machining liquid received from said electrochemical machine to a first container;
supplying a volume of the used machining liquid from the first container to a separation system, wherein the separation system is configured to treat the received used machining liquid and deliver a treated machining liquid; and
receiving the treated machining liquid in a second container.

5. The method of claim 1, further comprising:
selectively applying a first potential to said electrochemical machine when performing the electrochemical machining process in the macromachining mode or a second potential to said electrochemical machine when performing the electrochemical machining process in the micromachining mode, wherein the first potential is higher than the second potential.

6. The method of claim 5, wherein the first potential is a direct current potential in range from about 5 volts to about 20 volts.

7. The method of claim 5, wherein the second potential is a pulsed potential having an average potential in range from about 0.1 volt to about 5 volts.

8. The method of claim 5, further comprising:
selectively controlling a first gap between an anode and a cathode of said electrochemical machine when performing the electrochemical machining process in the macromachining mode or a second gap between the anode and the cathode of said electrochemical machine when performing the electrochemical machining process in the micromachining mode, wherein the first gap is greater than the second gap.

9. A method of operating an electrochemical machining system, comprising:
directing a used machining liquid from an electrochemical machine to a first container;
receiving the used machining liquid in the first container;
supplying a volume of the used machining liquid from the first container to a separation system, wherein the separation system is configured to receive the used machining liquid and deliver a treated machining liquid;
receiving the treated machining liquid in a second container; and
selectively performing an electrochemical machining process by said electrochemical machine in a macromachining mode or a micromachining mode by controlling supply of a quantity of the used machining liquid from the first container and a quantity of the treated machining liquid from the second container to said electrochemical machine.

10. A method of operating an electrochemical machining system, comprising:
selectively performing an electrochemical machining process by an electrochemical machine of said electrochemical machining system in a macromachining mode by applying a first potential to said electrochemical machine or in a micromachining mode by applying a second potential to said electrochemical machine, wherein the first potential is higher than the second potential; and
selectively providing a low purity machining liquid to said electrochemical machine when performing the electrochemical machining process in the macromachining mode or a high purity machining liquid to said electrochemical machine when performing the electrochemical machining process in the micromachining mode.

11. The method of claim 10, wherein the first potential is a direct current potential in range from about 5 volts to about 20 volts.

12. The method of claim 10, wherein the second potential is a pulsed potential having an average potential in range from about 0.1 volt to about 5 volts.

13. The method of claim 10, further comprising:
selectively controlling a first gap between an anode and a cathode of said electrochemical machine when performing the electrochemical machining process in the macromachining mode or a second gap between the anode and the cathode of said electrochemical machine when performing the electrochemical machining process in the micromachining mode, wherein the first gap is greater than the second gap.

14. The method of claim 10, wherein the selectively providing the low purity machining liquid or the high purity machining liquid comprises supply of a quantity of a used machining liquid received from said electrochemical machine, a quantity of a treated machining liquid received from a separation system, or a combination thereof to said electrochemical machine.

15. The method of claim 14, further comprising:
directing the used machining liquid received from said electrochemical machine to a first container;
supplying a volume of the used machining liquid from the first container to a separation system, wherein the separation system is configured to treat the received used machining liquid and deliver a treated machining liquid; and
receiving the treated machining liquid in a second container.

16. An electrochemical machining system comprising:
an electrochemical machine configured to selectively perform an electrochemical machining process in a macromachining mode or a micromachining mode;
a first container in fluid communication with the electrochemical machine and configured to contain a used machining liquid received from the electrochemical machine;

a separation system in fluid communication with the first container, wherein the separation system is configured to treat a volume of the used machining liquid received from the first container and deliver a treated machining liquid;

a second container in fluid communication with the separation system and configured to contain the treated machining liquid received from the separation system; and a flow controller in fluid communication with the first container and the second container, wherein the flow controller is configured to:

direct a quantity of the used machining liquid, a quantity of the treated machining liquid or a combination thereof to said electrochemical machine to selectively provide a low purity machining liquid when said electrochemical machine performs the electrochemical machining process in the macromachining mode or a high purity machining liquid when said electrochemical machine performs the electrochemical machining process in the micromachining mode.

17. The electrochemical machining system of claim 16, wherein the separation system comprises a centrifuge system.

18. The electrochemical machining system of claim 16, wherein the flow controller comprises a three-way valve.

* * * * *